(12) United States Patent
Petev et al.

(10) Patent No.: US 9,122,686 B2
(45) Date of Patent: Sep. 1, 2015

(54) NAMING SERVICE IN A CLUSTERED ENVIRONMENT

(75) Inventors: Petio Petev, Sofia (BG); Elitsa Pancheva, Sofia (BG)

(73) Assignee: SAP SE, Walldorf (DE)

( * ) Notice: Subject to any disclaimer, the term of this patent is extended or adjusted under 35 U.S.C. 154(b) by 2951 days.

(21) Appl. No.: 10/856,047

(22) Filed: May 27, 2004

(65) Prior Publication Data

US 2005/0278339 A1   Dec. 15, 2005

(51) Int. Cl.
*G06F 15/16* (2006.01)
*G06F 15/173* (2006.01)
*G06F 17/30* (2006.01)

(52) U.S. Cl.
CPC .............................. *G06F 17/30067* (2013.01)

(58) Field of Classification Search
CPC ................................................ G06F 17/30067
USPC ...................... 709/242, 245, 238; 707/10, 100
See application file for complete search history.

(56) References Cited

U.S. PATENT DOCUMENTS

| | | | | |
|---|---|---|---|---|
| 6,236,999 B1 * | 5/2001 | Jacobs et al. | ..................... | 707/10 |
| 6,363,421 B2 * | 3/2002 | Barker et al. | ................. | 709/223 |
| 6,389,451 B1 * | 5/2002 | Hart | ............................. | 709/201 |
| 6,457,053 B1 * | 9/2002 | Satagopan et al. | ............ | 709/226 |
| 6,480,508 B1 * | 11/2002 | Mwikalo et al. | .............. | 370/475 |
| 6,711,682 B1 * | 3/2004 | Capps | ........................... | 713/184 |
| 6,760,746 B1 * | 7/2004 | Schneider | ..................... | 709/203 |
| 6,813,635 B1 * | 11/2004 | Jorgenson | ..................... | 709/225 |
| 6,836,462 B1 * | 12/2004 | Albert et al. | .................. | 370/235 |
| 6,901,436 B1 * | 5/2005 | Schneider | ..................... | 709/219 |
| 7,272,636 B2 * | 9/2007 | Pabla | ............................. | 709/216 |
| 7,308,475 B1 | 12/2007 | Pruitt et al. | | |
| 7,590,639 B1 * | 9/2009 | Ivanova et al. | ........................ | 1/1 |
| 2002/0188657 A1 * | 12/2002 | Traversat et al. | ............ | 709/201 |
| 2003/0028585 A1 * | 2/2003 | Yeager et al. | ................. | 709/201 |
| 2003/0058277 A1 * | 3/2003 | Bowman-Amuah | .......... | 345/765 |
| 2004/0133652 A1 * | 7/2004 | Miloushev et al. | .......... | 709/214 |
| 2004/0148326 A1 * | 7/2004 | Nadgir et al. | ................. | 709/200 |
| 2004/0249904 A1 * | 12/2004 | Moore et al. | .................. | 709/216 |
| 2005/0021690 A1 * | 1/2005 | Peddada | ....................... | 709/220 |
| 2005/0044197 A1 * | 2/2005 | Lai | ................................ | 709/223 |
| 2005/0270973 A1 * | 12/2005 | Raev et al. | ..................... | 370/218 |

OTHER PUBLICATIONS

Sun Microsystems, Inc., *JNDI: Java Naming and Directory Interface*, Java Naming and Directory, Jan. 29, 1998, pp. ii-63, Palo Alto, California.

(Continued)

*Primary Examiner* — Gerald Smarth
(74) *Attorney, Agent, or Firm* — Schwegman Lundberg & Woessner, P.A.

(57) ABSTRACT

Within a cluster, when a new server node joins the cluster, an indication of the new server node has joined is received by at least one server node in the cluster. Global naming operations are disabled within the cluster. While the global naming operations are disabled, the global naming objects are replicated to the new server node. Once the replication is complete, global naming is reenabled for the cluster. In one embodiment of the invention, subsequent naming data from subsequent global naming operations is replicated in all server nodes in the cluster. One embodiment of the invention redirects naming operations directed to a down server node to a different server node within the cluster. One embodiment of the invention performs security checks responsive to a first access to the naming service.

24 Claims, 8 Drawing Sheets

(56) References Cited

OTHER PUBLICATIONS

Sun Microsystems, Inc., *JNDI SPI: Java Naming and Directory Service Provider Interface*, Java Naming and Directory SPI, Jan. 29, 1998, pp. ii-43.
Office Action dated Aug. 10, 2007, U.S. Appl. No. 10/856,051, filed May 27, 2004, whole document.
Office Action dated Jan. 24, 2008, U.S. Appl. No. 10/856,051, filed May 27, 2004, whole document.
Non-Final Office Action dated Nov. 16, 2008, U.S. Appl. No. 10/856,051, filed May 27, 2004, whole document.
Office Action dated Dec. 5, 2006, U.S. Appl. No. 10/856,053, filed May 27, 2004, whole document.
Office Action dated May 31, 2007, U.S. Appl. No. 10/856,053, filed May 27, 2004, whole document.
Final Office Action dated Nov. 15, 2007, U.S. Appl. No. 10/856,053, filed May 27, 2004, whole document.

\* cited by examiner

NAMING SERVICE IN A CLUSTERED ENVIRONMENT

BACKGROUND

1. Field of the Invention

Embodiments of the invention relate to naming. More specifically, embodiments of the invention relate to extensions to naming systems to increase robustness of the naming system.

2. Background

Naming service broadly refers to the mechanism by which an object is associated with a name and by which objects may be found given their names. Each name is generated by a set of syntactic rules called, "naming convention." An atomic name is an indivisible component of a name as defined by the naming convention. The association of the atomic name with an object is called, "binding." Some objects cannot be stored directly so they are put in the system as references. A "reference" is an object, which contains one or some addresses of objects which themselves are not directly bound to the naming system. Every name is interpreted relative to some context, and every naming operation is performed in a context object. A "context" is a set of bindings in which names are relative to a certain naming convention. A client may obtain an initial context object that provides a starting point for resolution of names in the naming system. Every naming system consists of contexts of a certain type (one and the same naming convention) that provide the same identical set of operations. Every operation is relative to a certain namespace. A "namespace" is the set of names in the naming system. The naming service organization of the namespace is a treelike structure of naming context objects that can be traversed to locate a particular name.

A directory service is a naming service that allows each bound object to be associated with attributes and provides a way to retrieve an object by looking up some of its attributes rather than its name (search). The "attributes" are object characteristics. Both the attributes and the object itself form a directory object. A "directory" is a linked set of directory objects.

In a Java context, basic support for the naming and directory service is provided by a Java Naming and Directory Interface (JNDI) such as specified in *JNDI: Java Naming and Directory Interface*, Version 1.2, published by Sun Microsystems of Mountain View, Calif. and subsequent revisions thereof (the JNDI Specification). The JNDI Specification meets the system requirements of Java 2 Enterprise Edition (J2EE). These requirements are defined in the Java 2 Enterprise Edition Specification 1.3, published Jul. 27, 2001 or subsequent versions thereof (the J2EE Standard). JNDI is defined to be independent of any specific directory service implementation. This permits a variety of directories to be accessed in a common way.

SUMMARY

Within a cluster, when a new server node joins the cluster, an indication that new server node has joined is received by at least one server node in the cluster. Global naming operations are disabled within the cluster. While the global naming operations are disabled, the global naming objects are replicated to the new server node. Once the replication is complete, global naming is reenabled for the cluster. In one embodiment of the invention, subsequent naming data from subsequent global naming operations is replicated in all server nodes in the cluster. One embodiment of the invention redirects naming operations directed to a down server node to a different server node within the cluster. One embodiment of the invention performs security checks responsive to a first access to the naming service.

BRIEF DESCRIPTION OF THE DRAWINGS

The invention is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

DETAILED DESCRIPTION

The results of naming operations are retained in a nonpersistent memory local to the creating server. Responsive to the reboot of the server all preexisting naming relationships are removed from the naming system. By using local memory, the speed of naming operations increases relative to the speed of operations in other existing naming services with persistent data storage.

Figure 1:
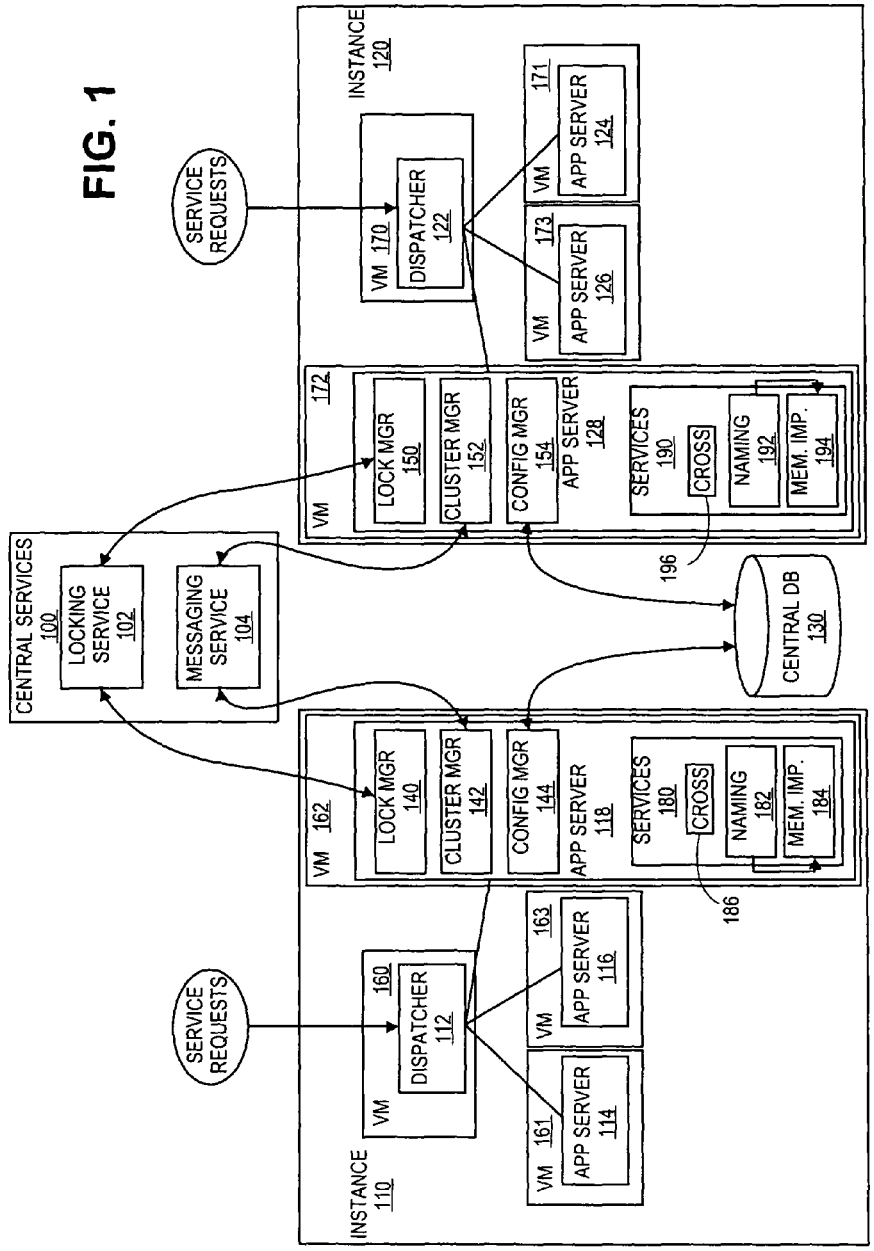
FIG. 1 is a block diagram of an application server architecture employing in one embodiment of the invention.

FIG. 1 is a block diagram of an application server architecture employed in one embodiment of the invention. The architecture includes central services "instance" 100 and a plurality of application server "instances" 110, 120. As used herein, application server instances, 110 and 120, each include a group of server nodes 114, 116, 118 and 124, 126, 128, respectively, and a dispatcher, 112, 122, respectively. Each application server node 114, 116, 118 and 124, 126, 128 and each dispatcher is resident in a virtual machine (VM) 160-163, 170-173. In one embodiment, the VM may be a Java Virtual Machine JVM). Central services instance 100 includes locking service 102 and messaging service 104 (described below). The combination of all of the application instances 110, 120 and central services instance 100 is referred to herein as a "cluster." Although the following description focuses primarily on instance 110 for the purpose of explanation, the same principles apply to other instances such as instance 120.

Server nodes 114, 116, 118 within instance 110 provide the business and/or presentation logic for the network applications supported by the system. Each application server, for example 118 and 128, provides a set of core services 180, 190 to the business and/or presentation logic. Among the services provided is naming service 182, 192. In one embodiment, the naming service 182, 192 stores data and objects resulting from naming operations, referred to collectively as "naming data", in the memory implementation 184, 194 of its respective virtual machine 162, 172. The memory implementation 184, 194 by its nature is non-persistent. As a result, when a server goes down and reboots the naming data is not retained. Accordingly, on reboot, the server is assured of a clear name space. Moreover, because the naming operations are not reliant on a DBMS, efficiency and reliability of the naming service is improved.

Another of the core services is cross service 186, 196. The cross service is used to provide redirection of naming operations from remote clients in the event that a server node fails. This redirection as discussed in greater detail below improves failover within the cluster.

Each of the server nodes 114, 116, 118 within a particular instance 110 may be configured with a redundant set of application logic and associated data. In one embodiment, dispatcher 112 distributes service requests from clients to one or more of server nodes 114, 116, 118 based on the load on each of the servers. For example, in one embodiment, a dispatcher implements a round-robin policy of distributing service requests (although various alternate load-balancing techniques may be employed). In one embodiment, the dispatcher performs load balancing on naming service requests from remote clients. However, once a remote client has received an initial context from a certain server node, the subsequent naming requests from that client are directed to the same server node.

In one embodiment of the invention, server nodes 114, 116, 118 are Java 2 Platform, Enterprise Edition ("J2EE") server nodes which support Enterprise Java Bean ("EJB") components and EJB containers (at the business layer) and Servlets and Java Server Pages ("JSP") (at the presentation layer). A J2EE platform complies with the j2EE Standard. In one embodiment, the naming service is compliant with the JNDI Specification. Of course, certain aspects of the embodiment of the invention described herein may be implemented in the context of other software platforms including, by way of example, Microsoft .NET platforms and/or the Advanced Business Application Programming ("ABAP") platforms developed by SAP AG, the assignee of the present application. Microsoft .Net Platforms implement the Active Directory Service Interfaces (ADSI) such as Active Directory Service Interfaces Version 2.5 published by Microsoft Corporation of Redlands, Wash. or other versions thereof (the ADSI Standard). Thus, in the context of a Net platform, the naming service would be compliant with the ADSI Standard.

In one embodiment, communication and synchronization between each of instances 110 and 120 is enabled via central services instance 100. As illustrated in FIG. 1, central services instance 100 includes messaging service 104 and locking service 102. Message service 104 allows each of the servers within each of the instances to communicate with one another via a message passing protocol. For example, messages from one server may be broadcast to all other servers within the cluster via messaging service 104. In addition, messages may be addressed directly to specific servers within the cluster (e.g., rather than being broadcast to all servers).

In one embodiment, locking service 102 disables access to (i.e., locks) certain specified portions of program code and/or configuration data stored within a central database 130. Locking managers 140 and 150 employed within the server nodes lock data on behalf of various system components which need to synchronize access to specific types of data and program code (e.g., such as the configuration managers 144 and 154). In one embodiment, messaging service 104 and locking service 102 are each implemented on dedicated servers. However, messaging service 104 and the locking service 102 may be implemented on a single server or across multiple servers while still complying with the underlying principles of embodiments of the invention.

As illustrated in FIG. 1, each server node (e.g., 118, 128) includes a lock manager 140, 150 for communicating with locking service 102; a cluster manager 142, 152 for communicating with messaging service 104; and a configuration manager 144, 154 for communicating with central database 130 (e.g., to store/retrieve configuration data). Although lock managers 140 and 150, cluster managers 142 and 152, and configuration managers 144 and 154 are illustrated with respect to particular server nodes, 118 and 128, in FIG. 1, each of the server nodes 114, 116, 124 and 126 and/or on the dispatchers 112, 122 may be equipped with equivalent lock managers, cluster managers, configuration managers, and services.

Figure 2:
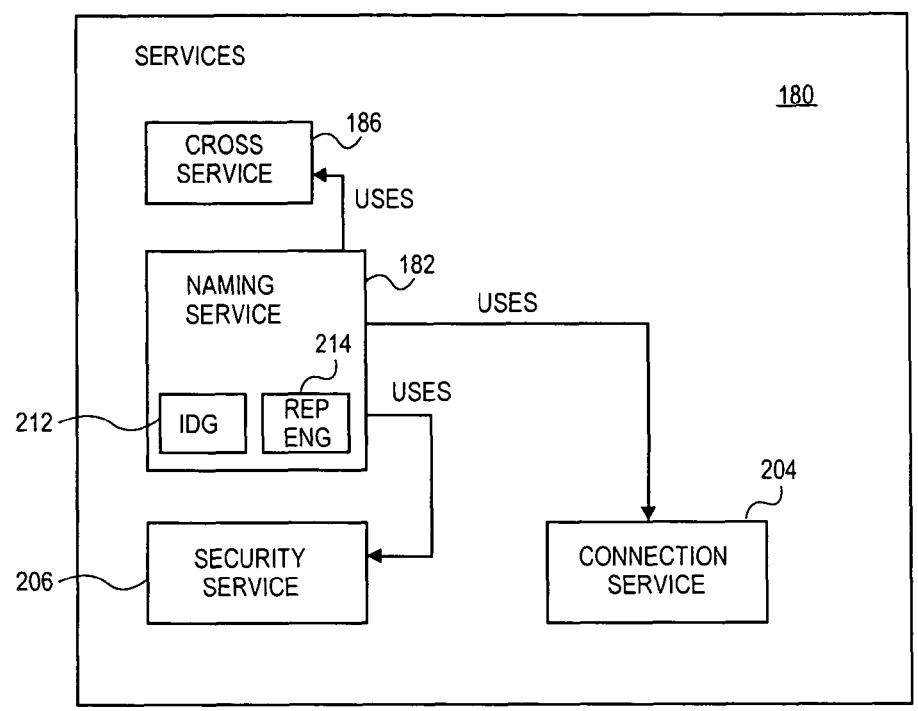
FIG. 2 is a block diagram of services in one embodiment of the invention.

FIG. 2 is a block diagram of services in one embodiment of the invention. Services 180 include naming service 182 which may use cross service 186, connection service 204, and security service 206.

The security service 206 is used to facilitate authorization of remote client accesses to the naming service 182. In one embodiment, the naming service 182 has only a weak reference to a security interface. Accordingly, if the security service 206 fails to provide the security interface the naming service 182 will run anyway. If running without the security interface, all clients have access to get an initial context in the naming hierarchy and may perform all possible operations within that context. However, if the security service 206 provides the security interface, security services are then available within the naming service 182. In one embodiment, a policy configuration context is acquired to manage the security roles. This management may include, for example, mapping and unmapping clients to security roles, checking legality of an operation and checking the existence of a mapping between a client and a security role.

JNDI defines two security roles, one in which complete access is granted to the naming hierarchy (sometimes referred to as the "administrator" role and one in which only lookup access is permitted (sometimes referred to as the "guest" role). If a client falls into neither role, no access to the naming hierarchy is permitted. Other embodiments may have multiple security roles rather than just two.

In one embodiment, an authentication context may be acquired from the security context. Authentication may be performed when a client attempts to get a new initial context. Once authenticated, the client is associated with a thread which gets the initial context. In one embodiment, authentication occurs on the client side. In one embodiment, authorization checks are performed on the server side for remote clients attempting to get an initial context. This authorization check may merely amount to checking the policy configuration context to determine the security role mapped to the client. The client is then returned an initial context with naming operations enabled consistent with its security role. In one embodiment, no authentication or authorization is performed for local clients.

Connection service 204 provides the naming service remote method invocation (RMI) to facilitate communication with remote clients. In one embodiment, to perform naming operations using the naming service 182 a client must first obtain a context instance. Calling a getInitialContext method of a desired factory returns a context instance.

For remote clients, the connection service 206 provides the connection to the naming service 182 within the server node. The remote client is provided a stub to a skeleton of the server node to be used to connect to the server node for all naming operations. The connection service ensures proper handling of remote objects. The cross service 186 specifies remote objects in the cluster and permits access to those objects. To accomplish this, the cross service 186 retains remote resources (referred to as "initial" objects) that are accessible with certain names. At start up, the naming service 182 gets the interface for the cross service 186. By getting JNDIProxyImpl as the initial object when a remote client attempts to get an initial context, the JNDI Proxy provides a stub that serves at the connection to naming functionality in a server node. The cross service 186 facilitates redirection as discussed above and also below with respect to FIG. 7. The redirection ensures that a remote client will be able to perform naming operation even though one server goes down. This improved reliability is important in a high availability system.

Naming service 182 includes an ID generator 212 which may be used to generate globally unique identifiers (GUIDS) for use in global naming operations. Naming service 182 also includes replication engine 214 to facilitate replication of global objects to other server nodes in the system. Referring back to FIG. 1, the same services shown as 180 may also occur in the other server nodes such as services 190 in server node 128.

Figure 3:
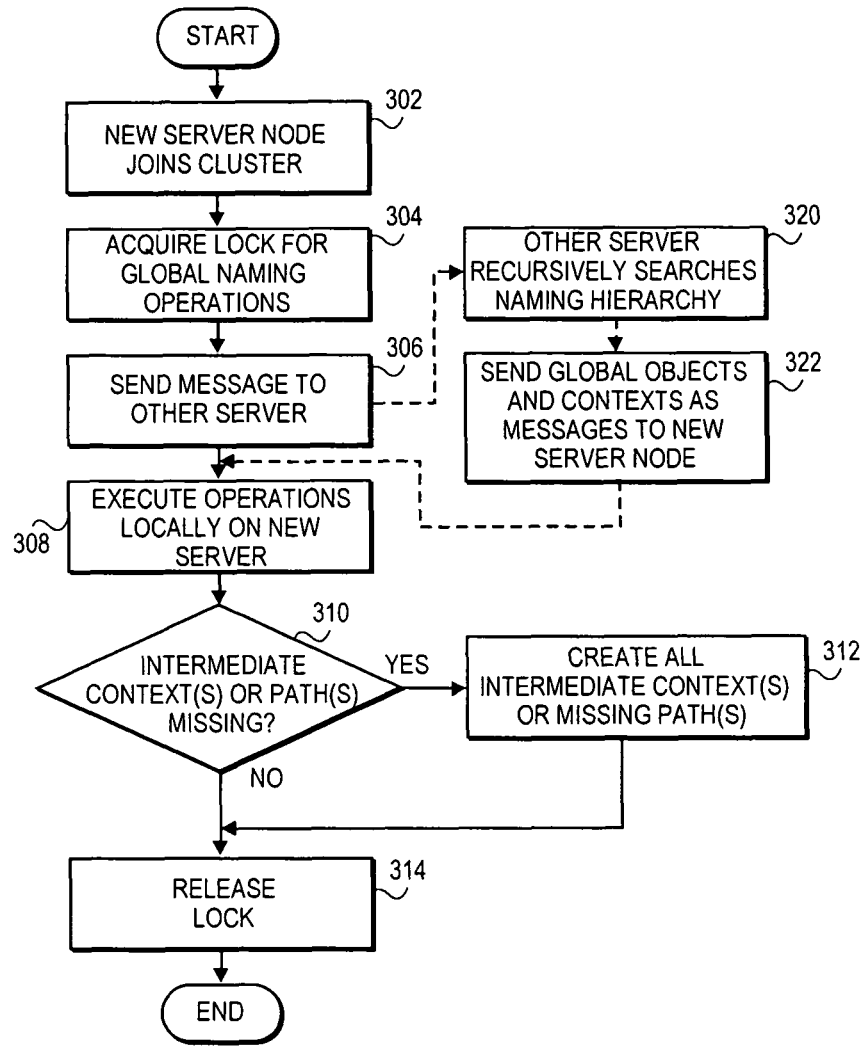
FIG. 3 is a flow diagram of operation when a server node joins a cluster.

FIG. 3 is a flow diagram of operation when a server node joins a cluster. At block 302 a server node joins the cluster. At block 304 the new server node acquires a lock for global naming operations. In one embodiment, the lock may be acquired from a central locking service (shown in FIG. 1). At block 306, the new server node sends a message to an arbitrary other server node in the cluster. For example, referring to FIG. 1, server node 118 joining the cluster may send the message via messaging service 104 to server node 128. The other server node (e.g. server node 228) recursively searches the naming hierarchy for global objects at block 320. At block 322, the other node sends the global objects and contexts found as messages to the new server node. In one embodiment, these are sent over a direct link between the source server node and the new server node rather than via the messaging service. Upon receiving the global objects and contexts, the new server node executes operations locally to construct the global portion of the naming hierarchy at block 308. A determination is made at decision block 310 if the intermediate contexts or paths are missing. If paths or contexts are missing, they are created in the new server node at block 312. Then at block 314 the lock is released. In this manner, the global naming hierarchy within the cluster is replicated to servers joining in the cluster. Because additional global naming operations are prevented from occurring during this replication, the integrity of the global naming hierarchy is maintained.

Figure 4A:
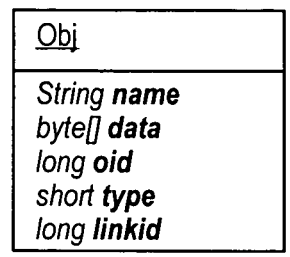
FIG. 4A is a diagrammatic representation of a first object type in one embodiment of the invention.

FIG. 4A is a diagrammatic representation of a first object type in one embodiment of the invention. The first object type is also referred to as an "Obj object" or "basic object." Basic object is use herein to draw a distinction from a "container object," but does not imply special characteristics and could be used interchangeably with "object." The first object type includes a string which is the name of the object. The name of the object is the atomic name for that object. The first object type also includes data in the form of a byte array. The byte array is a serialized directory object. A directory object includes attributes of the object, the object itself and the class name of the object. The basic object also includes a long variable used as the object identifier (ID) for the object. A short variable is used for the type of operation as a result of which the object was created. For example, the object may be created by a local operation or a global operation. Where the object is created by a global operation, it will be necessary to replicate the object to other virtual machines within a system. This operation is discussed below with reference to FIG. 5. Finally, a long variable is used as the link ID of the object. The link identifier is discussed in more detail below with reference to FIG. 4B. In one embodiment of the invention, bound objects in the naming system are represented by Obj or basic objects.

Figure 4B:
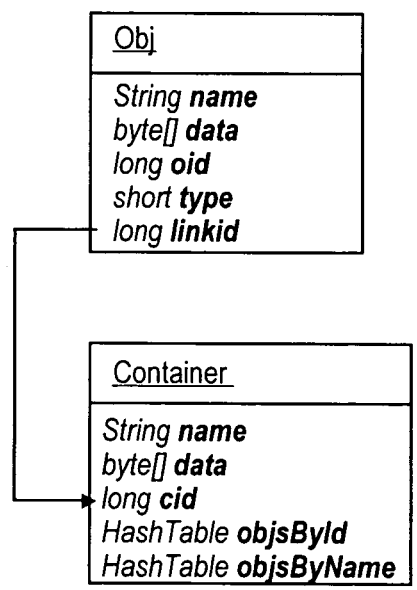
FIG. 4B is a diagrammatic representation of a context in one embodiment of the invention.

FIG. 4B is a diagrammatic representation of a context in one embodiment of the invention. A context in the naming system is represented by a basic object with a container object linked to it. The basic object has the form discussed above with reference to FIG. 4A. A container object has a name which is a string that is the whole path from the root context to the context represented by the container. The container data is a byte array of serialized attributes of the context. The container ID of type long is equal to the link ID of the basic object. The container object also contains two hash tables: a hash table of objects within the container by name and a hash table of objects within the container by ID. These hash tables facilitate rapid retrieval of objects within the container responsive to either requests by name or ID.

As noted above, where the basic object forms part of a context, the link identifier is equal to the container identifier of the container object, which the basic object is linked to form the context. However, where the object is merely a basic object not forming a context, the link identifier is selected to be a value that cannot be a container identifier. In one embodiment of the invention, the link identifier for all objects not forming a context is negative one (−1).

Figure 5:
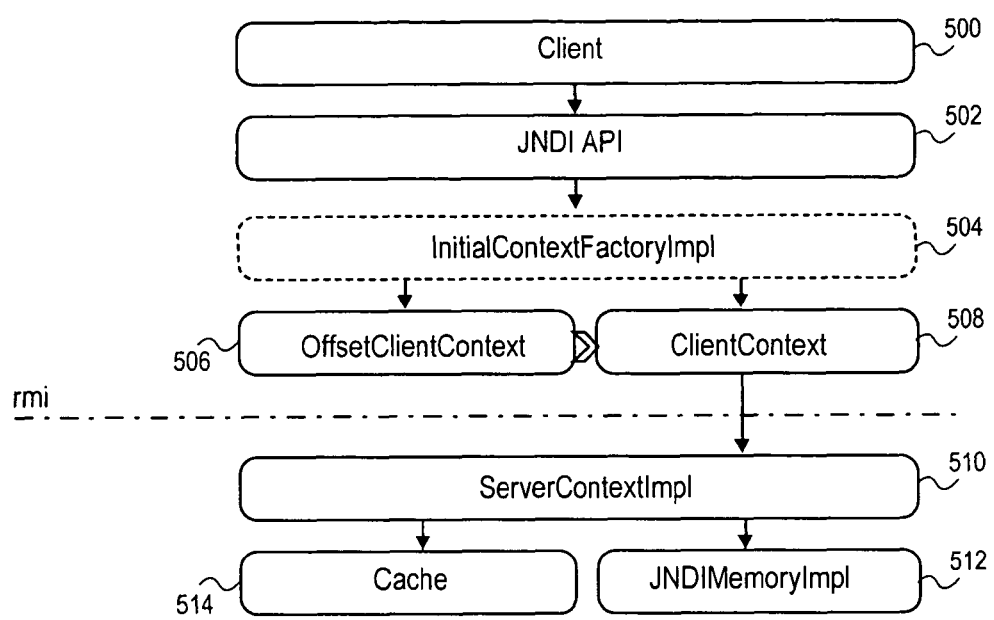
FIG. 5 is a diagram of layers in the naming system architecture in one embodiment of the invention.

FIG. 5 is a diagram of layers in the naming system architecture in one embodiment of the invention. A client source 500 uses a JNDI application programming interface (API) to request an initial context object. The client may be a local client, such as an application running within the same virtual machine as a naming service or may be a remote client defined as any client as not within the same virtual machine as the naming service.

At start up of the naming service, an initial context factory builder is established as a default factory builder in the javax.naming.spi.NamingManager such that a JNDI Application Programming Interface (API) 502 will access the initial context factory builder implementation when an initial context is requested by a client 500. The initial context factory builder will provide a proper initial context factory implementation 504 depending on the environment properties supplied by the client. The initial context factory implementation 504 will return either offset client context 506 or client context 508 depending on the properties of the environment. Client Context always returns the root context, which is an abstraction that forms a starting point for all subsequent naming operations. The returned context may then be organized under the root context or any subcontext within the naming tree dependent on the rights of the client. In one embodiment, only applications will be provided an instance of offset client context 506. Offset client context 506 is an extension of client context 508 and indicates that the context is other than the root context. This prevents application from accessing or creating objects higher up the naming tree. Applications are allowed to perform naming operations only in their own namespace, e.g. the context returned as initial context and the subcontexts created under it.

Client context 508 has an instance of server context interface which will be either server context implementation 510, if a client is local or a stub to the server context implementation if the client is remote. Remote clients may use Remote Method Innovation (RMI) to pass messages to the server context implementation. Local clients can communicate directly without using RMI. In one embodiment, the connection service provides the RMI. Local clients can obtain an initial context without using the connection service or RMI.

Server context implementation 510 is connected to the JNDI memory implementation 512, which functions as the naming repository in one embodiment of the invention. Also, in some embodiments of the invention, server context implementation 510 may be connected to a naming cache 514. Naming cache 514 may be used to increase the speed of lookup operations in the naming system. In one embodiment, the naming cache 514 holds object instances for application clients running on the server and byte arrays of the objects for all other clients.

In one embodiment, the naming cache includes two concurrent hash tables and a cache communicator. A first hash table keeps every cached object as byte array and name. Elements are added in this hash table any time a client performs a lookup operation. The second hash table keeps every cached object as an object instance and name. Elements are added in this hash table only if an application running on a local server performs a lookup operation. The cache communicator (CC) is registered as a message listener and performs the communication among the naming services in the different server nodes in the cluster. The CC is used to notify the cluster about the changes in cache, which concern global objects. If an unbind, rebind or rename operation is performed over a global object, the object will be removed from cache on the current server and a message with object name will be sent to all other servers to inform them of the invalid global object.

In one embodiment, JNDIMemoryImpl 512 is the implementation of the non-persistent naming data management within the naming service. JNDIMemoryImpl 512 keeps the hash tables of the containers stored by name and by ID and a handle to the root container object, which keeps hash tables of all the objects and subcontexts that can be found in the root context of the naming system stored by name and ID. All other containers have the same structure as the root container but are available for direct access. Thus the whole hierarchical tree like structure of objects and contexts in a naming system may be organized in hash tables with only two levels of nesting.

The following example of operation in one embodiment of the invention illustrates operations in response to local and global objects. For example, client performs a bind (String name, Object object) operation. First in ClientContext 508 the object parameter is wrapped in a directory object (DirObject) instance, serialized, if possible, and the byte array is sent to ServerContextImpl 510 where the type and correctness of the operation are evaluated.

In ServerContextImpl 510, if the operation involves a local object: the object is passed to a bind method of JNDIMemoryImpl 512. An object ID that is unique to the server is generated. The byte array representation of the object, the object ID, the type of the operation and the link ID identifying the container object linked to this object are wrapped in an Obj object and placed against the object name in the hash table instance of the container corresponding to the context in which the object has to be placed. In one embodiment, the link ID is the container ID (if the object represents a context) or −1 otherwise.

If the operation involves a global object: the object is still passed to the bind method of JNDIMemoryImpl 512. But the method generates an object ID of type long that is unique for the entire cluster. In one embodiment, this ID is generated from two integers—the server ID of the current server node and the consecutive number of the global bound object. The byte array representation of the object, the object ID, the type of the operation and the link ID form an Obj object, which is put against the object name in a hash table instance of a container corresponding to the context in which the object should be placed. Using the messaging service, (see FIG. 1), messages containing the ID, the name and the byte array representing the object, a byte parameter which shows whether the object is remote or not, and the name of the container in which the object should be placed are sent to all server nodes in the cluster. The name of the container is unique in the cluster and shows the full path name from the root context to the requested context. In one embodiment, the sender server does not wait to receive answers from the other server nodes whether the bind operation is performed successfully.

When a new server node is connected to the cluster it sends a message with a specific ID via the messaging service to an arbitrary server node with a request—information for all global objects and context to be sent to it. This message "arrives" in the CacheCommunicator instance of the receiver server and calls a method of JNDIMemoryImpl. Naming tree is recursively searched for global objects and contexts and if such are found they are sent as messages with all additional information to the server from which the request has been sent. The other server receives the messages and executes the operations locally. If the container in which the global object must be place does not exist, it is created and the object is put in it. If a part of the path of contexts from the root context to the context in which the object must be placed does not exist, all the missing intermediate contexts from the path are created. The names for the contexts are taken from the name of the container in which the object must be placed—it contains the whole path. In one embodiment, no responses are returned to the server, which sends the messages whether the replication is executed correctly or not.

Before every lookup operation, a check is made whether the looked up object is a global remote object, e.g. it is a global object created by a remote server node. If the object is a global remote object, the creating server is checked to insure the server remains in the cluster, e.g. has not shut down or crashed. If the creating server remains in the cluster, the object is returned as a result from the operation. Otherwise, the object is deleted from the hash table of the corresponding container and a message is sent to all other server nodes to delete the object from the hash table in their respective containers. If the object is not a global remote object, it is returned as a result from the operation.

Figure 6:
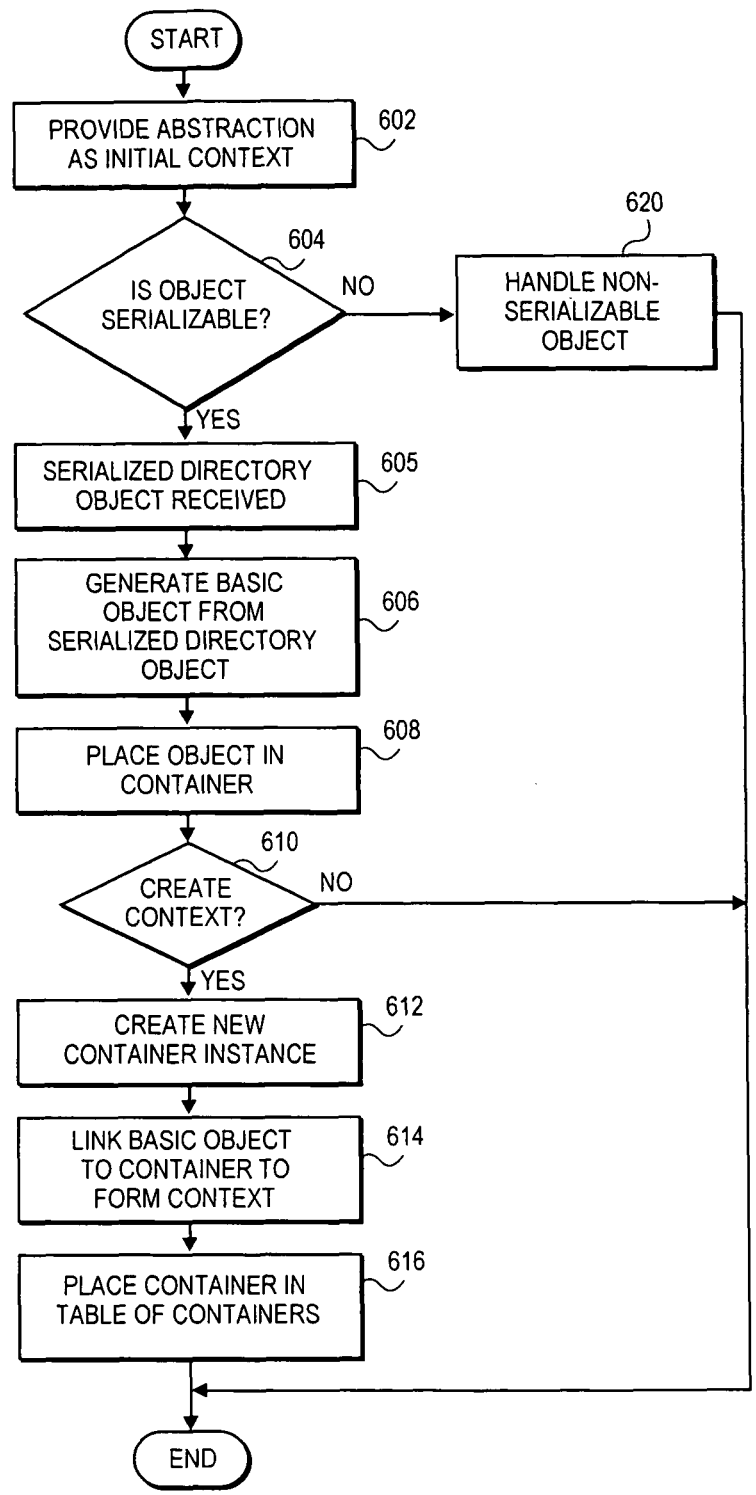
FIG. 6 is a flow diagram of operations in the naming service in one embodiment of the invention.

FIG. 6 is a flow diagram of operations in the naming service in one embodiment of the invention. At block 602, responsive to a request for initial context, naming service provides an abstraction as an initial context. In one embodiment, the root context is provided as the initial context.

At decision block 604, a determination is made if an object is serializable. If it is, at block 605 a serialized directory object is received from a client at the server side naming implementation. At block 606, the naming service generates a basic object from the serialized directory object. At block 608, the basic object is placed in a designated container within the naming hierarchy. This may take the form of placing the object in the hash table of the container objects. As previously noted, such hash table is retained in non-persistent storage. A determination is made at decision block 610 if the subcontext is to be created with the object. If so, at block 612, the naming service creates a new container instance. At block 614, the basic object is linked to the new container instance to form a context. At block 616, the container of the context is stored in the table of containers in nonpersistent memory. In one embodiment, this non-persistent storage may be a memory implementation of a Java virtual machine. If at decision block 610 no context was to be created, the routine ends. If at decision block 604 no serialized directory object is received (implying that the created object is non-serializable), naming system handles non-serializable object at block 620. One embodiment of the invention permits non-serializable objects to be bound within the naming system, but requires all data for such objects to be maintained on the client side. In such embodiments, the non-serializable objects are only available to the client which has bound them and all the clients running on the same VM.

By virtue of the fact that this storage is non-persistent, in the event that a reboot of the system or the server occurs, objects and context stored in the non-persistent storage are guaranteed to be removed from the naming system. As a result, naming service rebuilds the naming hierarchy on reboot without concerns of conflict from any preexisting naming hierarchy.

Figure 7:
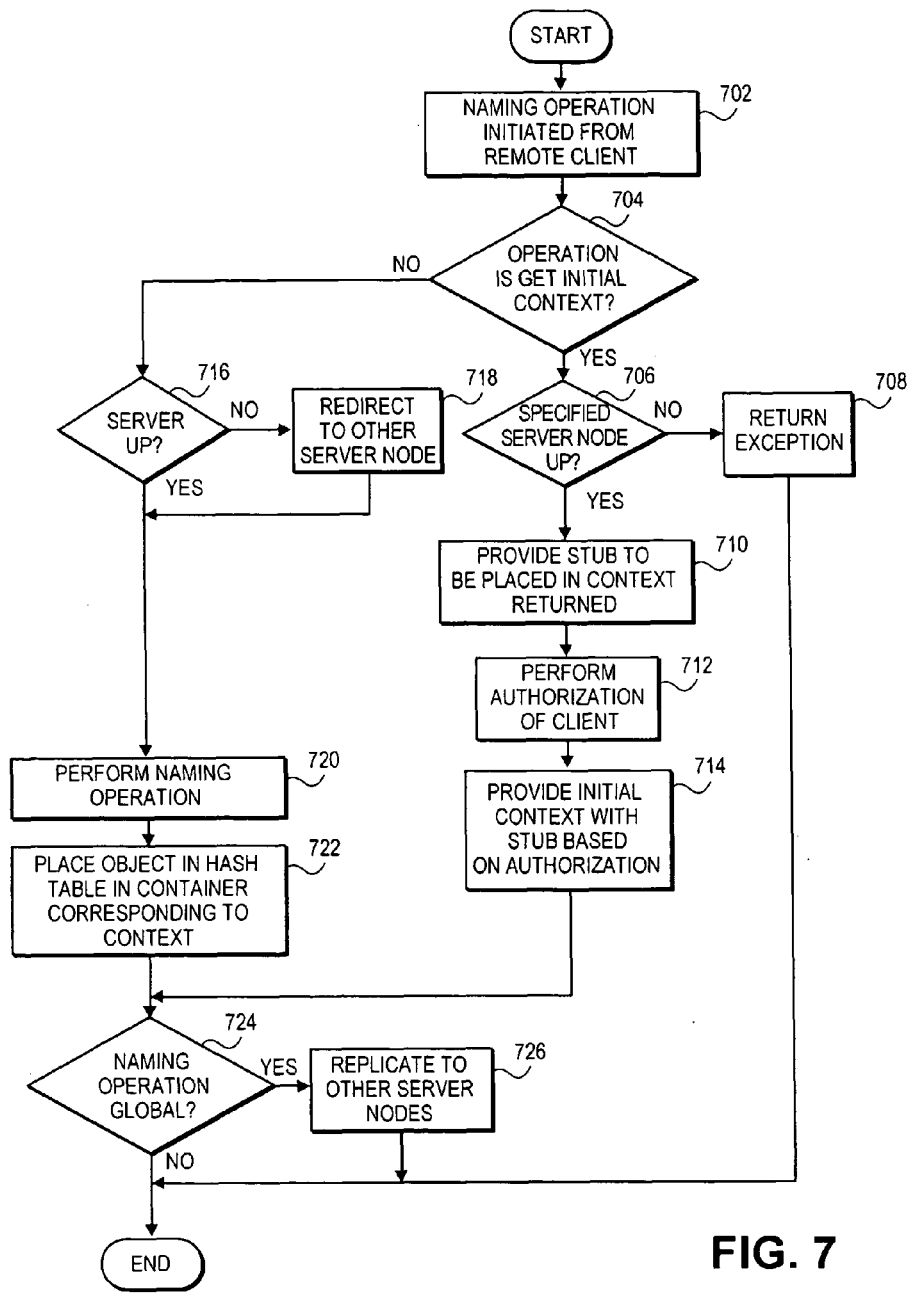
FIG. 7 is a flow diagram of service operations in the naming service in one embodiment of the invention.

FIG. 7 is a flow diagram of service operations in the naming service in one embodiment of the invention. At block 702, a naming operation is initiated from a remote client. At block 704, a determination is made if the naming operation is a getInitialContext operation. If it is, at block 706, a determination is made if a server node is specified and if so, whether the server node is up, e.g. has not crashed or shut down. For example, the remote client may attempt to connect to a particular server node. If the server node is down, the attempt to get ServerContext stub from that server will fail. In this case, at block 706, the getInitialContext operation will throw a NamingException stating that the server node whose naming service the client tried to use is down. If the client does not state explicitly in the environment properties from which particular server node it wants to use the naming service the connection service will choose a random server from the ones available in the cluster and will get the ServerContext stub fromthat server node.

Thus, if no server node is specified, a server node is deemed available or if the specified server node is up a stub to be placed in the returned, context is provided at block 710. The naming service accesses the security service to perform authorization of the client at block 712. After getting an initial context, no further authorizations are required for subsequent naming operations within that context. By limiting authorization to only the get initial context operation accesses the naming service the speed of naming operations for remote client can be increased.

At block 714, the client is provided an initial context, including a stub to the providing server node, based on the outcome of the authorization. This may result in the client being provided an initial context in which the client can perform all naming operation, only lookup operations or not being provided an initial context at all. On the client side, authentication may be performed using a user identification and password. The authenticated client is authorized on the server side by determining what security role is assigned to that authenticated client. In one embodiment, authentication is thread based and only performed if a context requested is a first context gotten by the thread as long as the first context has not been closed. In one embodiment, roles include an administrator role and a guest role. As a result going forward, all the naming operations that this client performs will be directed to this server.

If at decision block 704 the operation is not a get initial context operation, a determination is made at decision block 716 whether the server is up e.g., has not crashed or shut down. For example, if at some point the server has gone down and not come back up, the remote client not knowing the server is down, may try to execute a naming operation with the ServerContext stub, which exists on the client side, from the returned initial context as discussed above. The stub will try to invoke the corresponding operation of the ServerContext skeleton which is found on the server side. But when the server node is down, the corresponding skeleton is no longer available. Accordingly, in one embodiment, the connection service will redirect the naming operation to another server node at block 718.

Figure 7A:
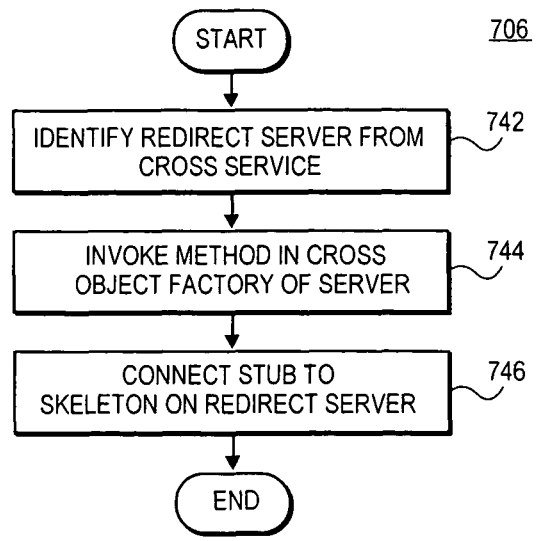
FIG. 7A is a flow diagram of redirection in one embodiment of the invention.

FIG. 7A is a flow diagram of redirection in one embodiment of the invention. At block 742, naming service identifies the server to receive the redirection from the cross service. In one embodiment, the server to receive the redirection (the "redirect server" for ease of notation) is identified by the connection service from the name registered with the cross service. At block 744, a method in the naming implementation of cross object factory of that server is invoked. In one embodiment, the connection service invokes a get object method on the redirect server identified. This method returns a skeleton to which the stub can be connected. At block 746, the stub is connected to the skeleton on the redirect server. The redirect server provides the naming service to the client. This provides increased reliability and failover for high availability systems.

Returning to FIG. 7, after redirection or if the server node is up, at block 720, the naming operation is performed. At block 722, the resulting object is placed in a hash table in a container corresponding to the context in which the naming operation took place. At decision block 724, the determination is made if the naming operation and/or context provided is global. The determination may be made by checking the type variable of the basic object. If the naming operation is global, the objects created are replicated at other server nodes at block 726. In one embodiment, replication is performed as described above with reference to FIG. 5.

Figure 7B:
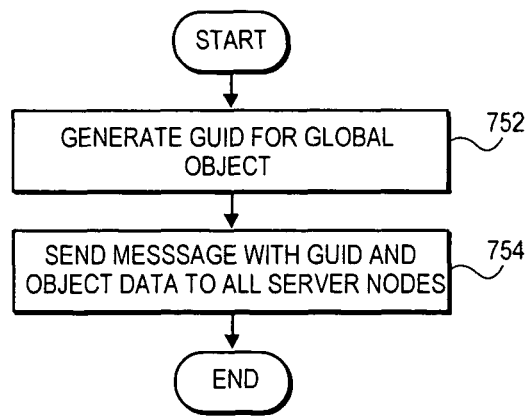
FIG. 7B is a flow diagram of replication of global objects in one embodiment of the invention.

FIG. 7B is a flow diagram of replication of global objects in one embodiment of the invention. At block 752, a global unique identifier (GUID) for the global object is generated. In one embodiment, the GUID is created by appending the server ID to the counter of global objects/contexts within the cluster. Thus, the first global operation has a GUID server ID1. A second would have server ID2 and so forth. At block 754, a message is sent with the GUID and object data to all server nodes in the cluster. In one embodiment, the sending server does not wait for or expect any acknowledgement of these messages. Rather, these are broadcast messages using the messaging service in the central services node.

Elements of embodiments may also be provided as a machine-readable medium for storing the machine-executable instructions. The machine-readable medium may include, but is not limited to, flash memory, optical disks, CD-ROMs, DVD ROMs, RAMs, EPROMs, EEPROMs, magnetic or optical cards, propagation media or other type of machine-readable media suitable for storing electronic instructions. For example, embodiments of the invention may be downloaded as a computer program which may be transferred from a remote computer (e.g., a server) to a requesting computer (e.g., a client) by way of data signals embodied in a carrier wave or other propagation medium via a communication link (e.g., a modem or network connection).

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

In the foregoing specification, the invention has been described with reference to specific embodiments thereof. It will, however, be evident that various modifications and changes can be made thereto without departing from the broader spirit and scope of the invention as set forth in the appended claims. The specification and drawings are, accordingly, to be regarded in an illustrative rather than a restrictive sense.

What is claimed is:

1. A system comprising:
a first server node;
a second server node;
a first naming service and a second naming service executing, using one or more processors, in the first server node and the second server node respectively, wherein the first naming service includes a first replication engine to replicate global naming data from the first server node to the second server node, and the second naming service includes a second replication engine to replicate the global naming data from the second server node to the first server node, the global naming data comprising objects resulting from naming operations; and
an identifier generator (IDG) to generate global unique identifiers (GUIDS) for the global naming data, wherein the IDG is located in the first naming service and generates the GUIDS from a server identifier of a creating server, a consecutive number of the global naming data, and context.

2. The system of claim 1 further comprising:
a security service to provide security interface for at least one of the first naming service and the second naming service.

3. The system of claim 2 wherein the security service provides authorization only when an initial context is requested by a remote client.

4. The system of claim 1 wherein the IDG comprises:
a counter to count global objects and contexts bound and created respectively in the system.

5. The system of claim 1 further comprising:
a connection service to provide a connection between a remote client and at least one of the first server node and the second server node.

6. The system of claim 5 wherein the connection service provides remote method invocation (RMI).

7. The system of claim 5 further comprising:
a cross service to redirect the connection from a first server node to a second server node if the first server node fails.

8. The system of claim 1 further comprising:
a locking service to prevent global naming operations in the system while a new server node joins the system; and
a replication engine in the new server node to replicate all global naming data in the new server node.

9. A method comprising:
receiving an indication that a new server node is joining a cluster of server nodes, the indication being a lock for global naming operations;
disabling the global naming operations within each server node in the cluster of server nodes;
replicating global naming objects in the new server node; and
enabling the global naming operations once replicating is complete.

10. The method of claim 9 further comprising:
identifying in a server node a global naming operation;
notifying other server nodes in the cluster of the global naming operation.

11. The method of claim 10 further comprising:
generating a unique global identifier for global objects from a server identifier of a creating server and a consecutive number of the global naming objects and contexts.

12. The method of claim 9 to further comprising:
redirecting a naming operation from a remote client directed to a target server node to a second server node if the target server node is down.

13. The method of claim 12 wherein redirecting comprises:
obtaining a name with which the second server is registered with a cross service; and
connecting a stub from the remote client to a skeleton from the second server.

14. The method of claim 9 further comprising:
checking an authorization of a remote client to use naming operations within the cluster only a first time the remote client attempts to access a naming service.

15. The method of claim 9 further comprising:
authenticating a remote client responsive to a request for an initial context.

16. An apparatus comprising:
means for proving global naming operations to generate a global unique identifier for each global object from a server identifier of a creating server, a consecutive number of the global naming data, and context;
means for replicating the global naming operations to a first server node joining a cluster;
means for notifying the cluster of global naming operations in any server node;
means for providing a connection between a remote client and at least one of the first server node and a second server node; and
means for providing, within each server, redirection of the connection from the first server node to the second server node if the first server node fails, the redirection by connecting a stub to a skeleton of the second server node.

17. The apparatus of claim 16 further comprising:
means for authenticating the remote client attempting naming operations; and
means for performing one time authorization of the remote client a first time a naming operation is attempted by the remote client.

18. A non-transitory machine-readable medium containing instructions that, when executed, cause a machine to perform operations comprising:
receiving an indication that a new server node is joining a cluster of servers, the indication being a lock for global naming operations;
disabling the global naming operations within each of the servers of the cluster of servers;
replicating global naming objects in the new server; and
enabling the global naming operations once replicating is complete.

19. The non-transitory machine-readable medium of claim 18 wherein the operations further comprise:
identifying in a server node a global naming operation;
notifying other server nodes in the cluster of the global naming operation.

20. The non-transitory machine-readable medium of claim 19 wherein the operation further comprise:
    generating a unique global identifier for global objects from a server identifier of a creating server and a consecutive number of the global naming operation.

21. The non-transitory machine-readable medium of claim 18 wherein the operation further comprise:
    redirecting a naming operation from a remote client directed to a target server node to a second server node if the target server node is down.

22. The non-transitory machine-readable medium of claim 21 wherein the operations further comprise:
    obtaining a name with which the second server is registered with a cross service; and
    connecting a stub from the remote client to a skeleton from the second server.

23. The non-transitory machine-readable medium of claim 18 wherein the operation further comprise:
    checking an authorization of a remote client to use naming operations within the cluster only a first time the remote client attempts to access the naming operations.

24. The non-transitory machine-readable medium of claim 18 wherein the operation further comprise:
    authenticating a remote client responsive to a request for an initial context.

* * * * *